US006353411B1

(12) United States Patent
Kriz

(10) Patent No.: US 6,353,411 B1
(45) Date of Patent: Mar. 5, 2002

(54) ANTENNA WITH SPECIAL LOBE PATTERN FOR USE WITH GLOBAL POSITIONING SYSTEMS

(75) Inventor: Jeffrey James Kriz, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/393,638

(22) Filed: Sep. 10, 1999

(51) Int. Cl.[7] .................................................. G01S 3/16

(52) U.S. Cl. ................... 342/379; 342/357.06; 342/372

(58) Field of Search ............................ 342/357.06, 372, 342/373, 379; 343/700 MS

(56) References Cited

U.S. PATENT DOCUMENTS

| | | | | |
|---|---|---|---|---|
| 4,827,271 A | | 5/1989 | Berneking | |
| 5,006,857 A | | 4/1991 | DeHart | |
| 5,021,792 A | * | 6/1991 | Hwang | 342/357 |
| 5,280,297 A | * | 1/1994 | Profera | 343/754 |
| 5,420,592 A | * | 5/1995 | Johnson | 342/357 |
| 5,504,493 A | * | 4/1996 | Hirshfield | 342/372 |
| 5,905,466 A | | 5/1999 | Jha | |
| 5,943,008 A | * | 8/1999 | Dusseldorp | 342/357 |
| 5,969,681 A | * | 10/1999 | O'Neill | 343/700 MS |
| 5,986,616 A | * | 11/1999 | Edvardsson | 343/853 |

FOREIGN PATENT DOCUMENTS

| | | |
|---|---|---|
| EP | 0590955 | 4/1994 |
| EP | 1059690 | 12/2000 |
| WO | 9300724 | 7/1993 |

OTHER PUBLICATIONS

Edward C. Jordan and Keith G. Balman, *Electromagnetic Waves and Radiating Systems*, 1968, pp. 431–443.

NTIS Tech Notes, US Department of Commerce, Springfield, VA, US; "Mechanically–steered, Mobile Satellite–Tracking Antenna," May 1, 1990, pp. 394, 1–02, whole document.

* cited by examiner

*Primary Examiner*—Thomas H. Tarcza
*Assistant Examiner*—Dao L. Phan

(57) ABSTRACT

A two-dimensional array of patch antennas positioned on a plate of dielectric material and so phased and weighted that they provide a three dimensional melon-shaped pattern having high attenuation from the plane of the array to a desired angle above the plane for use in a differential global position system to reject reflections from nearby objects.

9 Claims, 2 Drawing Sheets

ANTENNA WITH SPECIAL LOBE PATTERN FOR USE WITH GLOBAL POSITIONING SYSTEMS

BACKGROUND OF THE INVENTION

1. Field of the Invention

The present invention relates to antennas having three dimensional lobe patterns formed so as to attenuate signals received from objects which are within about 10 to 15 degrees of horizontal to substantially prevent GPS signals which are reflected off of ground objects from being received.

2. Description of the Prior Art

Global positioning systems (GPS) utilize signals from orbiting satellites to determine aircraft position. Differential global positioning systems (DGPS) are used around airports for guiding aircraft into landing patterns and landing. DGPS often utilize a ground based antenna to receive signals from the satellites and, knowing the ground based position exactly, provide corrections signals to the landing aircraft so that it may determine its position far more accurately. The antennas used in such ground based systems have a difficulty in distinguishing signals received directly from the satellites from those received by reflection from nearby objects such as the ground, buildings and trees (sometimes referred to as the multi-path problem). Accordingly, a number of efforts have been made to find ways of blocking or attenuating such reflected signals. A single patch antenna surrounded by truncated ground planes or a shaped blocking ring around the antenna has been used to alter the response to signals which are near the horizon level but to date, sufficient rejection of low angle signals while maintaining high gain for desired signals has not been achieved. Other attempts have been to use linear arrays of dipoles in combination with patch antennas and by altering the response to low level directions provide a lobe pattern which excludes multi-path signals. Such attempts have yet to be shown to be satisfactory in cost/performance for DGPS systems.

BRIEF DESCRIPTION OF THE INVENTION

The present invention uses a flat plate with a plurality of spaced patch antennas with controlled phases and amplitudes during signal summation and so positioned that a melon-shaped lobe pattern is obtained with high attenuation at just above the horizon and high gain above the attenuation region.

DETAILED DESCRIPTION OF THE PREFERRED EMBODIMENT

Figure 1:
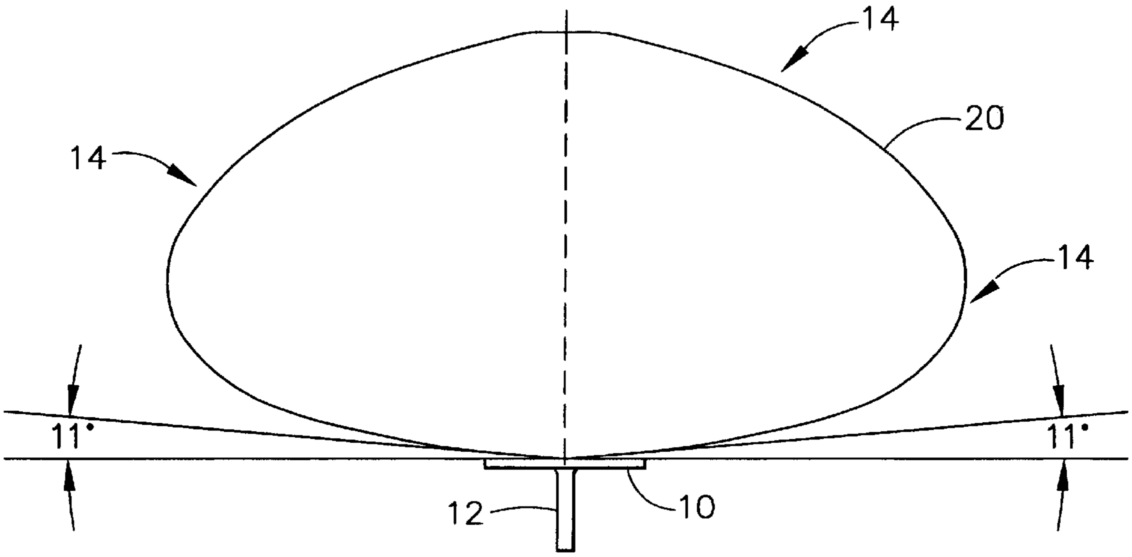
FIG. 1 is a side view of the antenna and its lobe pattern.
Figure 2:
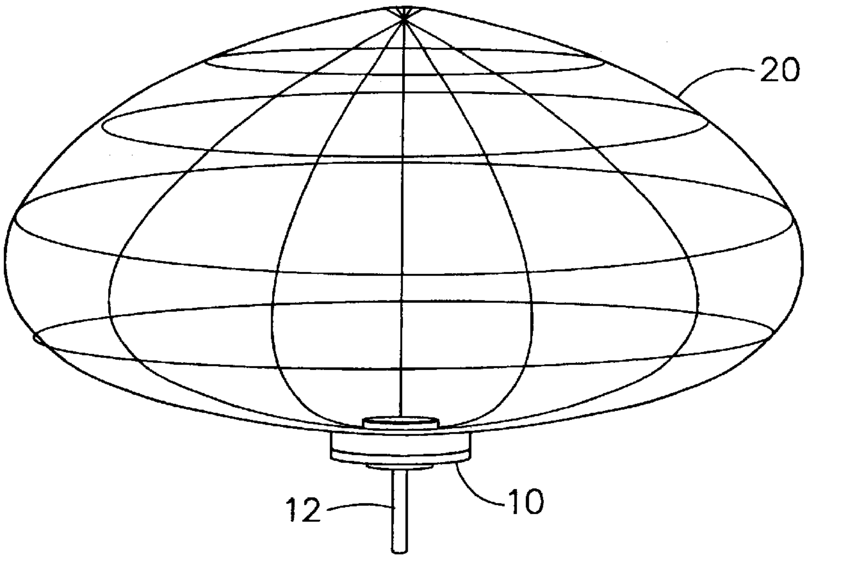
FIG. 2 is a perspective view of FIG. 1 showing the antenna and the lobe pattern in three dimensions.

Referring to FIGS. 1 and 2, a flat plate antenna array 10 is shown mounted on a pedestal 12 so as to receive signals, such as shown by arrows 14, from orbiting satellites (not shown). Array 10 includes a plurality of patch antennas seen in FIGS. 2 and 4 which are so spaced and tuned, as to create a lobe pattern 20 which is melon-shaped to provide high gain within the shape of the melon and high rejection below. In FIG. 1, the region of high attenuation is shown at and below 11 degrees from the horizontal but this exact angle is arbitrary and should be set to provide rejection for signals reflected from buildings and trees around the antenna. In the preferred embodiment, the patch antennas are circularly polarized and sized for GPS reception. One technique for adjusting the resultant radiation pattern is known as the Fourier Series analysis to determine amplitude and phase weighting for each element, a description of which may be found in a book entitled "Electromagnetic Waves and Radiating Systems" Second Edition, by Edward C. Jordan and Keith G. Balmain; Pages 431–443; published by Prentice-Hall, Inc., 1968. It is convenient to consider an array having an odd number of elements with a certain symmetry of current distribution about the center element. The expression for the far field strength of an odd numbered linear array can be expressed by the following equation:

$$|E| = 2\left\{\frac{a_0}{2} + \sum_{k=1}^{k=m}\left[a_k\cos k\psi + (-b_k)\sin k\psi\right]\right\} \tag{1}$$

where m is the number of elements in the array.

For a "m" element sized linear array the relative current distribution at each element is found as the coefficients of the described Fourier Series. Using the desired field strength in the far field and desired element spacing, the coefficients may be solved for, thus yielding the current distribution providing an approximation to the desired antenna pattern.

Typically, the next step is to generalize this theoretical linear array to a circular array by exploiting the point symmetry of the desired final product. Given this close approximation, iteration of the current amplitude and phase at each element may be performed using optimization techniques to search for and analyze nearby values that minimize field strength inaccuracies from for example, the desired pattern due to finite ground plane and antenna element size effects. This optimization may suitably be performed manually (derivation methods) or by automated means known to one of skill in the art, e.g., 3D finite element analysis.

Given these starting points either physical construction (trial and error) or electromagnetic (EM) simulations (finite element, method of moments etc.) are used to refine/optimize the solution accounting for element to element interactions and finite ground plane effects. The circuitry for the amplitude/phase adjustments may be placed on the under side of the planar array 10 which preferably is a dielectric material with a metallic ground plane on the underside.

Other small antenna styles and other combinations of amplitude/phase weighting of individual antennas within the array to provide a melon-shaped lobe with high attenuation below about 10 to 15 degrees may also be employed.

Figure 3:
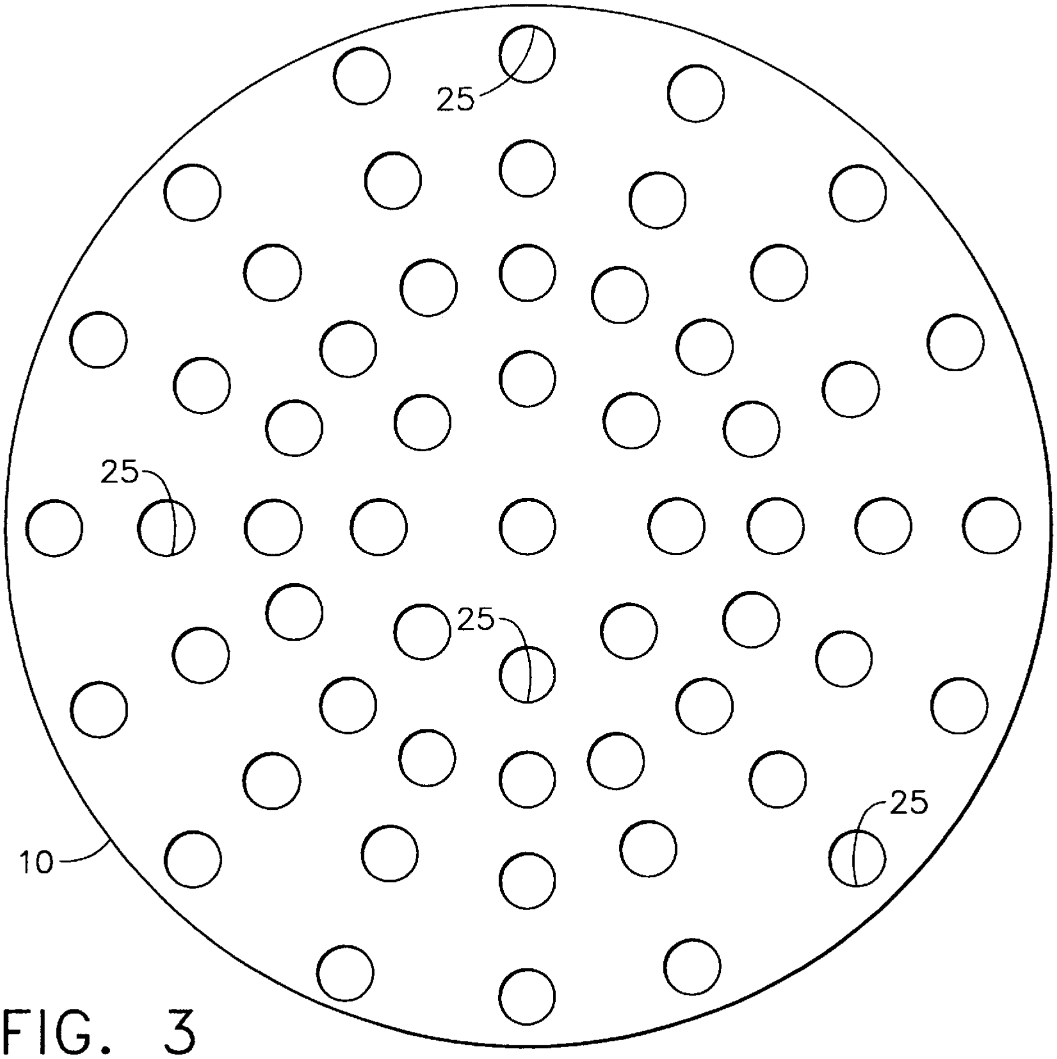
FIG. 3 is a top view of the antenna of the present invention.
Figure 4:
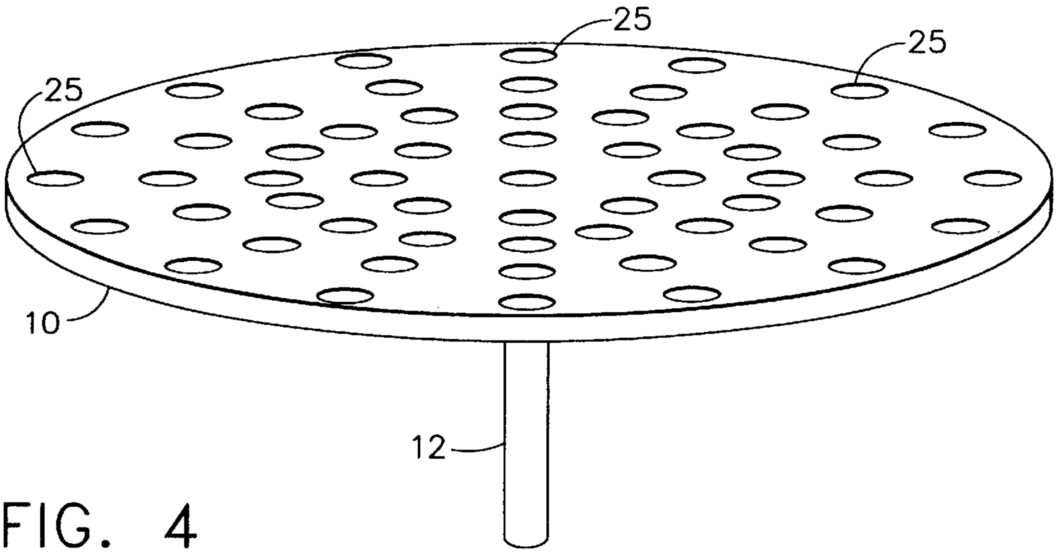
FIG. 4 is a perspective view of FIG. 3.

FIGS. 3 and 4 show the top side and perspective view, respectively, of the planar array 10 with a plurality of spaced radially extending patch antennas 25. While 57 antennas are used in FIGS. 3 and 4, a different number of antennas may be employed and, in fact, it appears that the greater the number, the better the shaping of the lobe. Furthermore, the radial arrangement is for purposes of convenience in drawing and other patterns of horizontally displaced antenna patches may be used. The key in achieving a suitable pattern is the use of a sufficient number of patches to approximate the desired current distribution across the entire phased array antenna aperture.

With an antenna array such as shown in the present invention, good reception of signals from orbiting satellites is obtained while reflected signals from low lying buildings and trees is attenuated. Many improvements will occur to those having skill in the art and I do not wish to be limited by the specific showing used in connections with describing the preferred embodiments.

The embodiments of the invention in which an exclusive property or right is claimed are defined as follows:

1. An antenna for use with global positioning systems comprising:

a flat horizontally positioned plate;

a plurality of patch antennas spaced around on the plate in two dimensions, said antennas so phase shifted and amplitude weighted as to provide a lobe pattern which is melon-shaped and which provides high attenuation of signals that are received from just above the horizon.

2. The antenna for claim 1 wherein the flat plate is of dielectric material.

3. The antenna of claim 1 wherein the plurality of antennas is spaced around a center and extends in radial directions therefrom.

4. The antenna of claim 1 wherein the high attenuation extends from the horizon to between 10 and 15 degrees above the horizon.

5. The antenna of claim 1 wherein the patch antennas are circularly polarized and are sized for global position signal reception.

6. The antenna of claim 1 wherein the patch antennas are combined using passive phase and amplitude weighted transmission line circuitry according to optimized values determined by Fourier Series analysis.

7. An antenna for use in a global positioning system comprising:

a flat plate of dielectric material;

a plurality of circularly polarized patch antennas sized for global position system signal reception and positioned around in two dimensions on the dielectric material, said antennas being combined in a predetermined phase and amplitude relationship to produce a melon-shaped lobe pattern of for good reception of the global position system signals and with a sharp cutoff area from about 10 to 15 degrees above the horizon to provide high attenuation of signals reflected from any objects around the antenna.

8. The antenna of claim 7 wherein the plurality of antennas is spaced around a center and extends in radial directions therefrom.

9. The antenna of claim 7 wherein the predetermined phase and amplitude relationship is determined using Fourier analysis to synthesize the desired radiation/reception pattern.

* * * * *